(12) United States Patent
Yen et al.

(10) Patent No.: US 8,275,348 B2
(45) Date of Patent: Sep. 25, 2012

(54) METHOD FOR MANAGING TELEPHONE CALLS IN A VEHICLE

(75) Inventors: Corina Yen, Lexington, MA (US); Brian Finn, East Palo Alto, CA (US); Jo Ann Sison, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 891 days.

(21) Appl. No.: 12/131,030

(22) Filed: May 30, 2008

(65) Prior Publication Data

US 2009/0298482 A1 Dec. 3, 2009

(51) Int. Cl.
H04M 11/04 (2006.01)
G08B 23/00 (2006.01)
(52) U.S. Cl. ..................... 455/404.1; 340/576
(58) Field of Classification Search ................ 455/404.1
See application file for complete search history.

(56) References Cited

U.S. PATENT DOCUMENTS

| | | | |
|---|---|---|---|
| 6,600,975 B2 * | 7/2003 | Moriguchi et al. | 701/1 |
| 6,974,414 B2 | 12/2005 | Victor | |
| 7,292,152 B2 * | 11/2007 | Torkkola et al. | 340/576 |
| 7,349,782 B2 | 3/2008 | Churchill et al. | |
| 7,609,150 B2 * | 10/2009 | Wheatley et al. | 340/436 |
| 2006/0034441 A1 | 2/2006 | Kraft | |

FOREIGN PATENT DOCUMENTS

| | | |
|---|---|---|
| DE | 10346660 A1 | 5/2005 |
| DE | 102005013443 A1 | 9/2006 |
| DE | 60124937 T2 | 9/2007 |
| WO | 0230700 A2 | 4/2002 |
| WO | 03036805 A1 | 5/2003 |

OTHER PUBLICATIONS

Search Report issued by the German Patent Office for German Patent Application No. 10 2009 018 074.5, dated Dec. 10, 2009.

* cited by examiner

*Primary Examiner* — Lester Kincaid
*Assistant Examiner* — Joel Ajayi
(74) *Attorney, Agent, or Firm* — Manfred Beck, P.A.

(57) ABSTRACT

A method for managing an ongoing telephone call in a vehicle includes the steps of monitoring signals provided by vehicle systems and monitoring conversational cognitive load indicators for a driver during the telephone call. A current driving situation is assessed by evaluating the signals provided by the vehicle systems and by evaluating the conversational cognitive load indicators. A semantic cue is provided during the telephone call, wherein the semantic cue is indicative of the current driving situation and wherein the semantic cue is audible at least for a caller calling the driver. Methods for managing incoming telephone calls and assisting the driver with outgoing telephone calls are also provided.

15 Claims, 10 Drawing Sheets

| INCOMING CALL SCREENING FOR EMERGENCY SCENARIOS | | |
|---|---|---|
| SENSING | LOGIC | RESPONSE |
| • BRAKES<br>• STEERING WHEEL<br>• SPEED<br>• TURN SIGNAL<br>• HONKING HORN<br>• TRACTION CONTROL | • AMOUNT OF BRAKING GREATER THAN A GIVEN VALUE → HARD BRAKING<br>• ANGLE OF TURN GREATER THAN A GIVEN VALUE → SHARP TURN, SWERVING, WINDY ROADS<br>• TURN SIGNAL ON AND SPEED OR ACCELERATION GREATER THAN A GIVEN VALUE → MERGING, CHANGING LANES<br>• HORN → EMERGENCY SITUATION<br>• COEFFICIENT OF TIRE FRICTION LESS THAN A GIVEN VALUE → SKIDDING | • CALLER IS TOLD THAT USER IS DRIVING<br>• DRIVER GETS NO ALERT; WHEN SITUATION RETURNS TO NORMAL, THE DRIVER IS ALERTED TO THE CALL OR THE MISSED CALL |

| INCOMING CALL SCREENING FOR EMERGENCY SCENARIOS |||
|---|---|---|
| SENSING | LOGIC | RESPONSE |
| <ul><li>BRAKES</li><li>STEERING WHEEL</li><li>SPEED</li><li>TURN SIGNAL</li><li>HONKING HORN</li><li>TRACTION CONTROL</li></ul> | <ul><li>AMOUNT OF BRAKING GREATER THAN A GIVEN VALUE → HARD BRAKING</li><li>ANGLE OF TURN GREATER THAN A GIVEN VALUE → SHARP TURN, SWERVING, WINDY ROADS</li><li>TURN SIGNAL ON AND SPEED OR ACCELERATION GREATER THAN A GIVEN VALUE → MERGING, CHANGING LANES</li><li>HORN → EMERGENCY SITUATION</li><li>COEFFICIENT OF TIRE FRICTION LESS THAN A GIVEN VALUE → SKIDDING</li></ul> | <ul><li>CALLER IS TOLD THAT USER IS DRIVING</li><li>DRIVER GETS NO ALERT; WHEN SITUATION RETURNS TO NORMAL, THE DRIVER IS ALERTED TO THE CALL OR THE MISSED CALL</li></ul> |

FIG. 1

| INCOMING CALL SCREENING FOR SCENARIOS RELATING TO AT-RISK SITUATIONS | | |
|---|---|---|
| SENSING | LOGIC | RESPONSE |
| <ul><li>WINDSHIELD WIPERS</li><li>FOG LIGHTS</li><li>NAVIGATION/GPS INFORMATION</li><li>REVERSING</li><li>TRACTION CONTROL (ASR) OR RELATIVE STABILITY (ESP)</li></ul> | <ul><li>SPEED OF WINDSHIELD WIPERS GREATER THAN A GIVEN VALUE → DANGEROUS WEATHER</li><li>FOG LIGHTS → IMPAIRED VISION CONDITIONS</li><li>NAVIGATION TO A NEW DESTINATION → UNFAMILIAR ROUTE</li><li>NAVIGATION/GPS INDICATES DRIVER IN LOCATION WITH ADVERSE ROAD CONDITIONS</li><li>REVERSING → PARKING, BACKING OUT</li><li>COEFFICIENT OF TIRE FRICTION LESS THAN A GIVEN VALUE → SLIPPERY ROAD CONDITIONS</li></ul> | <ul><li>CALLER IS TOLD THAT USER IS DRIVING AND IS PLACED ON HOLD</li><li>DRIVER GETS SUBTLE ALERT TO CALL AND CHOOSES TO IGNORE OR PICK UP</li></ul> |

FIG. 2

| INCOMING CALL SCREENING FOR SCENARIOS RELATING TO INCONVENIENT SITUATIONS |||
| --- | --- | --- |
| SENSING | LOGIC | RESPONSE |
| <ul><li>SEAT/MIRROR ADJUSTMENT</li><li>CLIMATE CONTROL ADJUSTMENT</li><li>MUSIC/NAVIGATION ADJUSTMENT</li><li>NAVIGATION TURN-BY-TURN DIRECTIONS</li><li>PDA USE</li></ul> | <ul><li>CONTROL ADJUSTMENTS → DRIVER PREOCCUPIED</li><li>UPCOMING TURN OR EXIT → NEED TO CONCENTRATE</li></ul> | <ul><li>CALLER TOLD USER IS DRIVING AND IS PLACED ON HOLD</li><li>DRIVER GETS SUBTLE ALERT TO CALL AND CHOOSES TO IGNORE THE CALL OR PICK UP</li></ul> |

FIG. 3

| INCOMING CALL SCREENING FOR SCENARIOS RELATING TO USER-SET PREFERENCES |||
| --- | --- | --- |
| SENSING | LOGIC | RESPONSE |
| <ul><li>CALLER ID</li><li>PRE-SET CALL LIST</li><li>TIME</li></ul> | <ul><li>SELECTIVE BASED ON CALLER</li><li>SELECTIVE BASED ON DRIVING CONDITIONS</li><li>SELECTIVE BASED ON TIME</li></ul> | <ul><li>PUT ALL CALLS THROUGH</li><li>PUT CALLERS ON LIST THROUGH, SEND CALLERS NOT ON LIST TO VOICE MAIL</li><li>SEND ALL CALLS TO VOICE MAIL</li></ul> |

FIG. 4

| GENERAL INCOMING CALL SCREENING |||
|---|---|---|
| SENSING | LOGIC | RESPONSE |
| <ul><li>CALLER ID</li><li>CALLER URGENCY LEVEL INPUT (ENTERED AFTER BEING PROMPTED)</li></ul> | <ul><li>GENERAL CALL MANAGEMENT RULES</li></ul> | <ul><li>CALLER TOLD USER IS DRIVING AND CHOOSES TO STAY ON HOLD OR HANG UP</li><li>CALLER CAN USE NUMBER ENTRY TO INDICATE URGENCY OF CALL</li><li>DRIVER IS ALERTED TO CALL, THE ID OF THE CALLER, AND THE URGENCY LEVEL OF THE CALL</li><li>DRIVER CAN IGNORE CALL WITH A "CAN'T TALK" BUTTON, SYSTEM TELLS CALLER THE DRIVER CAN'T TALK BECAUSE USER IS DRIVING</li></ul> |

FIG. 5

| DURING CALL MANAGEMENT FOR EMERGENCY SCENARIOS |||
|---|---|---|
| SENSING | LOGIC | RESPONSE |
| <ul><li>BRAKES</li><li>STEERING WHEEL</li><li>SPEED</li><li>HONKING HORN</li><li>TRACTION CONTROL (ASR)</li><li>CONVERSATIONAL INDICATORS OF COGNITIVE LOAD</li></ul> | <ul><li>AMOUNT OF BRAKING GREATER THAN A GIVEN VALUE → HARD BRAKING</li><li>ANGLE OF TURN GREATER THAN A GIVEN VALUE → SHARP TURN, SWERVING, WINDY ROADS</li><li>TURN SIGNAL ON AND SPEED OR ACCELERATION GREATER THAN A GIVEN VALUE → MERGING, CHANGING LANES</li><li>HORN → EMERGENCY SITUATION</li><li>COEFFICIENT OF TIRE FRICTION LESS THAN A GIVEN VALUE → SKIDDING</li><li>COGNITIVE LOAD GREATER THAN A GIVEN LEVEL → DRIVER UNABLE TO CONCENTRATE</li></ul> | <ul><li>CALL IS MUTED IN THE VEHICLE UNTIL SITUATION RETURNS TO NORMAL</li><li>CALLER HEARS A LOUD SEMANTIC AUDIO CUE INDICATIVE OF THE SITUATION</li></ul> |

FIG. 6

| DURING CALL MANAGEMENT FOR SCENARIOS RELATING TO AT-RISK SITUATIONS | | |
|---|---|---|
| SENSING | LOGIC | RESPONSE |
| ▪ NAVIGATION TURN-BY-TURN<br>▪ REVERSING<br>▪ TURN SIGNAL<br>▪ WINDSHIELD WIPERS<br>▪ CONVERSATIONAL INDICATORS OF COGNITIVE LOAD | ▪ NAVIGATION → DRIVER NEEDS TO HEAR AND FOLLOW DIRECTION<br>▪ REVERSING → PARKING, BACKING UP<br>▪ TURN SIGNAL → MERGING, CHANGING LANES, TURN<br>▪ WINDSHIELD WIPERS → BAD WEATHER<br>▪ COGNITIVE LOAD GREATER THAN A GIVEN LEVEL → DRIVER UNABLE TO CONCENTRATE | ▪ BACKGROUND NOISE INDICATIVE OF SITUATION IS ADDED TO THE CALL |

FIG. 7

| OUTGOING CALL MANAGEMENT | | | |
|---|---|---|---|
| SCENARIO | SENSING | LOGIC | RESPONSE |
| CAN'T TALK | • DRIVER INPUTS NUMBER | | AUTOMATED MESSAGE SENT TO CALLER SAYING DRIVER CAN'T TALK |
| LOCATION | • DRIVER INPUTS NUMBER<br>• GPS/NAVIGATION | IF NO ROUTE IN PROGRESS, DRIVER WANTS THE DRIVER'S LOCATION TO BE COMMUNICATED | AUTOMATED MESSAGE SENT TO CALLER WITH DRIVER'S CURRENT LOCATION |
| DESTINATION | • DRIVER INPUTS NUMBER<br>• GPS/NAVIGATION | IF ROUTE IN PROGRESS, DRIVER WANTS DESTINATION AND ESTIMATED TIME OF ARRIVAL COMMUNICATED | AUTOMATED MESSAGE SENT TO CALLER WITH DRIVER'S CURRENT LOCATION, DESTINATION AND ESTIMATED TIME OF ARRIVAL |
| LATENESS | • DRIVER INPUTS NUMBER AND MEETING TIME -OR- PDA: ACCESS MEETING TIME AND PARTICIPANTS<br>• GPS/NAVIGATION | IF ROUTE IN PROGRESS, DRIVER WANTS DESTINATION AND ESTIMATED TIME OF ARRIVAL COMMUNICATED | AUTOMATED MESSAGE SENT TO CALLER WITH DRIVER'S CURRENT LOCATION, DESTINATION AND HOW LATE THE DRIVER WILL BE |
| MEETING | • DRIVER INPUTS NUMBER AND MEETING TIME<br>• GPS/NAVIGATION | IF ROUTE IN PROGRESS, DRIVER WANTS DESTINATION AND ESTIMATED TIME OF ARRIVAL COMMUNICATED | AUTOMATED MESSAGE SENT TO CALLER WITH DRIVER'S CURRENT LOCATION AND ASKS TO MEET AT DESTINATION AT ESTIMATED TIME OF ARRIVAL |

FIG. 8

METHOD FOR MANAGING TELEPHONE CALLS IN A VEHICLE

BACKGROUND OF THE INVENTION

Field of the Invention

The invention relates to a method for managing telephone calls in a vehicle.

Cell phone use while driving is an increasingly popular behavior despite its distracting effect on drivers and the resulting increased risk of crashes. Incoming telephone calls can interrupt at times when the driver needs to concentrate on the task of driving. Conversations while driving may be distracting to the driver when the person who is on the phone with the driver is unaware of the driver's changing context. For example, a person who is on the phone with the driver will generally be unaware of a dangerous driving situation that requires the driver to focus on the primary task of driving rather than talking or listening to the caller. Performing two tasks at the same time, such as using a cell phone while driving, can increase the driver's workload to an extent that it has a negative effect on the ability to perform the two tasks in a satisfactory manner. In particular, the distraction resulting from using a cell phone while driving may disadvantageously interfere with the driver's ability to drive safely.

Currently, commercially available telephone kits for vehicles focus mainly on integrating cell phone use into the vehicle system. These telephone kits generally do not focus on improving driver safety. More advanced systems that suppress incoming calls if the system senses that the driver is swerving, overtaking, or braking hard are however described in the prior art.

For example, U.S. Pat. No. 7,292,152 B2 describes a method for classifying a driver's activity state. Sensor data relating to vehicle operating conditions are used in order to determine the driver activity and to classify the driver activity into one of at least two states. Vehicle monitoring sensors provide data related to the environment in which the vehicle is operating, for example, the road conditions, traffic conditions, and weather. Sensors also provide vehicle operating data. An on-board navigation system provides data related to the vehicle location. Driving conditions, for example road surface and traction estimates, can be provided by anti-lock braking, traction control and chassis control system sensors. Radar, laser, ultra-sonic and video systems can provide a map of objects near the vehicle and their motion relative to the vehicle. Weather information and time of day may also be monitored directly or derived from sources such as window wipers, lights and defrosters.

U.S. Pat. No. 7,292,152 B2 further discloses that the driver activity that is not directly related to driving may be monitored. Seat sensors and/or infrared sensors may sense the number and locations of passengers in the vehicle. Floor and steering wheel sensors may indicate the position of the driver's feet and hands. Video or imaging sensors may monitor head, body, hand and feet movements of the driver. The operative states and driver usage of information, entertainment and telematics systems may also be monitored. Other activities that can be monitored include adjusting the radio, using a cellular telephone, obtaining navigation information, adjusting the environmental controls, and conversation level. U.S. Pat. No. 7,292,152 B2 further discloses that data related to a vehicle operation can be captured directly by monitoring vehicle controls such as applying the accelerator or brakes, turning the steering wheel, using turn signals, windshield washer/wipers, and window defoggers. Data derived from the vehicle controls or other sensors can be used to evaluate the driver's cognitive load, for example by evaluating a rate of change of the accelerator and the brake pedal, by evaluating the turn radius combined with the vehicle speed and electronic suspension settings. U.S. Pat. No. 7,292,152 B2 further teaches that the method for classifying a driver's activity state can be adapted to individual personal skill-levels, preferences, tastes and habits by recognizing the driver of the vehicle.

With respect to a potential driver distraction caused by the use of a cell phone, the driver's cognitive load is evaluated. An enabled cell phone may provide two potential cut-offs of cell phone calls to a driver without completely prohibiting calls. In the first instance, the caller is informed, by a pre-recorded message, that the call is being completed to a person presently driving a vehicle. The caller is then given the option of having the call sent directly to voicemail or putting the call through to the driver. Before the call is put through to the driver, it is determined when the potential for driver distraction is beyond certain desired limits. For example, if the driver's cognitive load would exceed a threshold, the incoming call may be held and/or automatically transferred to voicemail with a pre-recorded message.

The cell phone can also be configured to take corrective actions in the event that there is an increase in the driver's cognitive load during an on-going call. If, after accepting a cell phone call, it is determined that the driver's cognitive load has increased beyond a threshold level, the cell phone may automatically suspend the telephone call. In this case, a message is provided that informs the caller that the caller is being temporarily placed on hold and/or the caller is offered the option to leave a voice mail message. The driver can be made aware of the call interruption by providing an appropriate message to the driver indicating that the call has been placed on hold.

Another method for monitoring and managing driver attention loads is for example described in U.S. Pat. No. 6,974,414 B2. One aspect of the workload manager is to pause dialogue of audible conversation or information such as incoming and outgoing telephone conversations. Another workload manager or safety manager for vehicles that evaluates a driver's workload and prioritizes tasks accordingly is for example also described in U.S. Pat. No. 7,349,782 B2.

SUMMARY OF THE INVENTION

It is accordingly an object of the invention to provide a method for managing telephone calls in a vehicle which increases driver safety and makes it easier for a driver to handle telephone calls while driving. Another object of the invention is to provide a method for managing telephone calls in a vehicle which can be implemented without requiring a substantial outlay in terms of hardware.

With the foregoing and other objects in view there is provided, in accordance with the invention, a method for managing telephone calls, which includes the steps of:

monitoring signals provided by vehicle systems;

monitoring conversational cognitive load indicators for a driver during a telephone call in a vehicle;

assessing a current driving situation by evaluating the signals provided by the vehicle systems and by evaluating the conversational cognitive load indicators; and providing, in dependence of an assessment of the current driving situation, a semantic cue during the telephone call, wherein the semantic cue is indicative of the current driving situation and wherein the semantic cue is audible at least for a caller calling the driver.

An advantage of the above-defined method according to the invention is that cell phone use in the vehicle is managed such that ease of use as well as driver safety is increased by mediating a telephone call through the use of semantic cues if the call interferes with the primary task of driving based on an assessment of the current driving situation. Another advantage of the in-vehicle call management method according to the invention is that it can utilize the vehicle's CAN (controller area network) messages and thus requires very little additional outlay when implemented. With respect to the call management according to the invention, the term caller is understood as any party involved in a communication or an attempted communicating with the driver irrespective of who initiates the communication.

According to another mode of the method of the invention, the step of assessing a current driving situation by evaluating signals provided by vehicle systems includes evaluating at least one signal selected from the group of a brake control signal, a steering angle signal, a vehicle speed signal, a horn control signal, a traction control signal (ASR), a stability control signal (ESP), a turn signal control signal, a fog light control signal, a windshield wiper control signal and a reverse gear engagement control signal. These signals are suitable to find out whether there is an emergency situation or an at-risk situation.

According to another mode of the method of the invention, the step of assessing a current driving situation further includes evaluating a navigation signal provided by an in-vehicle navigation system.

According to another mode of the method of the invention, the step of providing a semantic cue indicative of the current driving situation includes providing, as the semantic cue, an artificial background noise selected from the group of a sound of screeching tires, a sound of a horn, turn-by-turn navigation directions, turn signal click sounds, a back-up beep sound, a windshield wiper operating noise and a rain noise. The above-listed noises are easily recognized and convey information about the current driving situation.

According to another mode of the method of the invention, the step of assessing a current driving situation by evaluating signals provided by the vehicle systems includes concluding that the current driving situation is an emergency situation if an emergency condition is met, wherein the emergency condition is a condition selected from the group of an amount of braking being greater than a given value, an angle of turn being greater than a given value and a coefficient of tire friction being less than a given value.

Another mode of the method according to the invention includes muting the telephone call in the vehicle in case of an emergency situation; and providing, as the semantic cue audible for the caller, an artificial background noise indicative of the emergency situation. In this case, the driver is not distracted by the telephone call and the caller is informed about the emergency situation.

According to another mode of the method of the invention, the step of assessing a current driving situation includes concluding that the current driving situation is an at-risk situation if an at-risk condition is met, wherein the at-risk condition is a condition selected from the group of a turn signal activation, a reverse gear engagement, a windshield wiper operation and turn-by-turn navigation directions provided for the driver. The above-listed conditions are suitable for indicating that the driver needs to concentrate on a driving situation such as a lane-change maneuver, a back-up maneuver, bad weather or driving in an unfamiliar area.

Another mode of the method according to the invention includes providing the semantic cue such that the semantic cue is indicative for the at-risk situation and such that the semantic cue is audible for the driver and for the caller. This is advantageous because the semantic cue moderates the conversation and allows the driver to concentrate on the task of driving.

According to another mode of the method of the invention, the step of assessing a current driving situation includes concluding that the current driving situation is an at-risk situation if an evaluation of the conversational cognitive load indicators shows that a threshold level for a cognitive load has been exceeded. Conversational cognitive load indicators are for example backchannel responses ("uh" or "um") or speech disfluencies.

According to another mode of the method of the invention, the step of monitoring conversational cognitive load indicators includes monitoring backchannel responses provided by the driver and the step of assessing a current driving situation includes concluding that the current driving situation is an at-risk situation based on a frequency of the backchannel responses.

In addition to the above-defined management of an ongoing telephone call, there is also provided, a method for managing incoming telephone calls, wherein the method includes the steps of:

monitoring signals provided by vehicle systems;
receiving a telephone call in a vehicle;
assessing a current driving situation by evaluating the signals provided by the vehicle systems in order to determine whether the current driving situation is one of an emergency situation and an at-risk situation;
placing the telephone call on hold if the current driving situation is one of an emergency situation and an at-risk situation;
providing a message for a caller who has been placed on hold; and
selectively providing an alert to a driver about the telephone call if the current driving situation is an at-risk situation and providing no alert to the driver about the telephone call if the current driving situation is an emergency situation.

Another mode of the method according to the invention includes providing an alert to the driver about the telephone call after the emergency situation ends.

According to another mode of the method of the invention, the step of assessing a current driving situation by evaluating signals provided by the vehicle systems includes evaluating at least one signal selected from the group of a brake control signal, a steering angle signal, a vehicle speed signal, a horn control signal, a traction control signal, an stability control signal, a turn signal control signal, a fog light control signal, a windshield wiper control signal, a navigation system control signal and a reverse gear engagement control signal.

Another mode of the method according to the invention includes prompting a caller to communicate an urgency level of the telephone call; and presenting the urgency level provided by the caller and an identification of the caller (caller ID) to the driver. By providing information on the urgency of the call and the identity of the caller, it is easier for the driver to ignore unimportant calls.

Another mode of the method according to the invention includes determining whether the current driving situation is an inconvenient situation for accepting the telephone call based on evaluating at least one signal selected from the group of a seat adjustment control signal, a mirror adjustment control signal, a climate adjustment control signal, a stereo adjustment control signal, a turn-by-turn navigation control signal and a personal digital assistant control signal; and placing the caller on hold and providing an alert to the driver about the telephone call if the current driving situation is determined to be an inconvenient situation.

In addition to the above-defined management of an ongoing telephone call or an incoming telephone call, there is also provided, a method for managing outgoing telephone calls, wherein the method includes the steps of:

inputting a given telephone number to be called by a telephone provided in a vehicle;

detecting a current location of the vehicle by using a navigation system; and sending an automated message to the given telephone number, wherein the automated message includes information about a current location of the vehicle.

Another mode of the method according to the invention includes calculating an estimated arrival time at a destination and including information about the estimated arrival time in the automated message.

Another mode of the method according to the invention includes calculating an estimated arrival time at a destination and comparing the estimated arrival time to a given meeting time; and including, in the automated message, information about how late a driver of the vehicle will be for a meeting at the destination.

A main advantage of providing an automated message with information about a current location of the vehicle, an estimated time of arrival or other information that may be of interest for people participating in a meeting with the driver is that the workload of the driver is reduced.

Other features which are considered as characteristic for the invention are set forth in the appended claims.

Although the invention is illustrated and described herein as embodied in a method for managing telephone calls in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a table illustrating an incoming call screening for an in-vehicle call management according to the invention in case of an emergency situation;

FIG. 2 is a table illustrating an incoming call screening for an in-vehicle call management according to the invention in case of a situation involving some risk;

FIG. 3 is a table illustrating an incoming call screening for an in-vehicle call management according to the invention in case of a situation when an incoming call is inconvenient for a driver;

FIG. 4 is a table illustrating an incoming call screening with user-set preferences for an in-vehicle call management according to the invention;

FIG. 5 is a table illustrating a general incoming call screening for an in-vehicle call management according to the invention;

FIG. 6 is a table illustrating a call management during an ongoing telephone call for an in-vehicle call management according to the invention in case of an emergency situation;

FIG. 7 is a table illustrating a call management during an ongoing telephone call for an in-vehicle call management according to the invention in case of a situation involving some risk;

FIG. 8 is a table illustrating an outgoing call assistance for an in-vehicle call management according to the invention;

DESCRIPTION OF THE PREFERRED EMBODIMENTS

Figure 9:
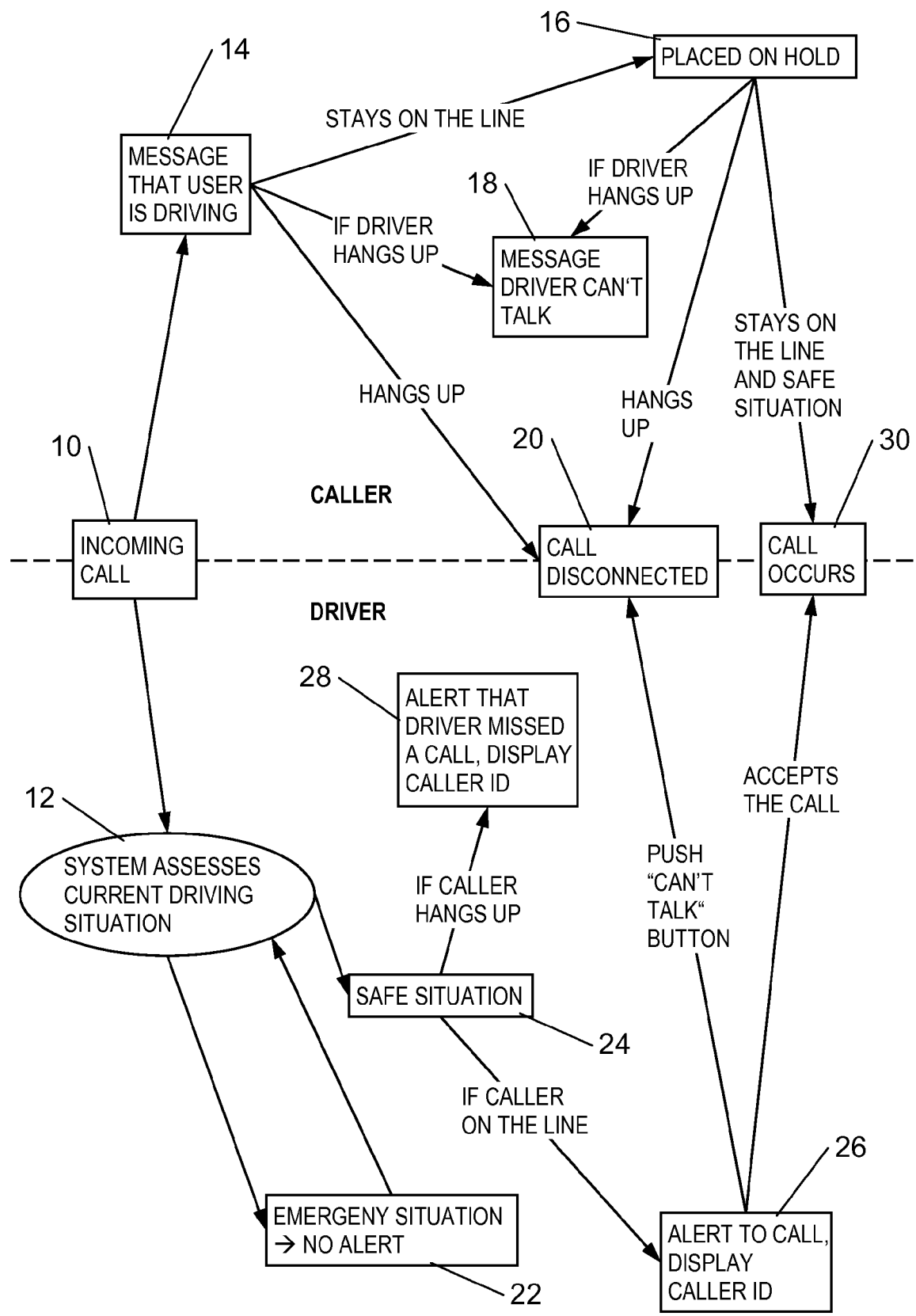
FIG. 9 is a flow chart illustrating a process of screening incoming telephone calls in accordance with the invention in case of an emergency scenario.

The in-vehicle call management system according to the invention is configured to manage cell phone use in the vehicle in order to increase ease of use as well as driver safety by mediating telephone calls that could interfere with driving based on assessing the current driving situation. The in-vehicle call management system utilizes the vehicle's CAN (Controller Area Network) messages and the vehicle's navigation system/GPS (Global Positioning System) information to monitor the current driving situation, as well as the telephone system's ability to moderate the cell phone use in the vehicle. The vehicle's CAN messages include information from various systems and/or sensors such as the anti-lock braking (ABS) system, the traction control system (ASR, Anti-Slip Regulation), the electronic stability control system (ESP, Electronic Stability program), the transmission control system, the steering angle sensor, speed sensors, a turn signal control, a horn control, a head light and fog light control, a rain sensor and any other sensor information that is suitable for monitoring the vehicle's driving state.

The method for an in-vehicle call management according to the invention has three main components, namely incoming call screening, during call management, and outgoing call assistance. The incoming call screening and the management of ongoing calls are based on evaluating the vehicle's driving situation and general call management rules. The management of ongoing calls is improved by monitoring the driver's phone call for production of conversational cognitive load indicators in addition to evaluating the vehicle's driving situation. Conversational cognitive load indicators are for example audible responses of a person who listens to another person speaking on the phone.

Some main aspects and features of the method according to the invention are described in the following. In accordance with an aspect of the invention, different types of responses to incoming calls are provided based on the vehicle's current state which includes an evaluation of whether the situation is safe enough for the driver to pay attention to the phone call. A broad range of parameters is monitored in order to determine the vehicle's current state, including for example information related to turn signals, traction control and GPS/navigation. The GPS/navigation information indicates road geometry, road characteristics and traffic conditions for the vehicle's position. According to another aspect of the invention, semantic audio cues are used during a phone call in order to communicate to a distant caller the driver's situation. Also, enhanced audio from outside the vehicle may be used to communicate to the distant caller the driver's situation. Specific examples of audio cues are described below.

In accordance with another aspect of the invention, an automated messaging system that utilizes navigation information is integrated into a vehicle telephone kit. According to another feature of the invention, conversational indicators of cognitive load are monitored as an information source for the system to determine when the driver is not able to attend to a call in progress. The conversational indicators of cognitive load may for example include an articulation rate, filled and empty speech pauses, production of backchannel responses (e.g., "uh" and "um"), hesitations, and speech disfluencies from the driver. These conversational indicators can be used as an information source for the system to determine when a driver is not able to attend to a call in progress.

In the following, an exemplary embodiment of an incoming call screening for an in-vehicle call management according to the invention is described with reference to FIGS. 1 to 5. The screening of incoming calls is performed in accordance with a cost-benefit evaluation. A decision to pick up a call while driving is made based on a balancing of the benefit of the call against the cost of distracted driving. Factors that are considered for evaluation a benefit of the call may include the identity of the caller (who is calling?), the subject of the call (what are they calling about?), the relevance of the call (is the call relevant to the driving task at hand?), time sensitivity of the call (how time sensitive is the call?). The cost-benefit evaluation determines the cost of the call based on how much attention the current driving situation requires. Exemplary methods of determining the cost of the call are illustrated in FIGS. 1 to 3.

In accordance with an embodiment of the invention, the factors related to a benefit of the call are presented to the driver in order to facilitate the driver's decision whether to take a call. In order to communicate to the driver the identity of the caller, a caller ID may be visually presented or spoken via a speech interface. In order to communicate to the driver how urgent a call is, the call management system may be configured to ask the caller how urgent the call is and then communicate this information to the driver along with the caller ID.

The cost of the call will be assessed based on information related to the driving situation. CAN (Controller Area Network) messages that indicate the driving situation may be evaluated in order to determine how safe it is for the driver to take a call at the time the caller is calling. FIG. 1 is a table illustrating in an exemplary manner an incoming call screening for an in-vehicle call management according to the invention in case of an emergency situation. The in-vehicle call management system receives sensor information from the vehicle brake system, the vehicle steering system and the traction control system (ASR). The call management system further receives information about an actuation of the horn and the turn signal as well as vehicle speed information.

The second column of FIG. 1 illustrates the evaluation logic that the in-vehicle call management system uses in order to determine the "cost" of the call in terms of driver distraction. If the amount of braking is greater than a given value, the in-vehicle call management system concludes that there is an emergency and that the cost of the call is accordingly high. In response to a determination that there is an emergency situation, the in-vehicle call management system informs the caller that the user is driving. The driver is not alerted to the call while the emergency situation exists. When the driving situation returns to normal, the driver is alerted to the call, which may be on hold, or the driver is alerted to the missed call.

FIG. 1 lists further criteria that are used to determine whether an emergency situation exists. For example, if the angle of turn is greater than a given value, the in-vehicle call management system concludes that there is a sharp turn, that the vehicle swerves or that there is a windy road. In this case, the in-vehicle call management system concludes that there is an emergency and the driver is not alerted to the call as long as the emergency situation exists. Other factors that allow the in-vehicle call management system to determine the existence of an emergency situation include the vehicle speed, the vehicle longitudinal and transverse acceleration, turn signal and horn actuation, a coefficient of tire friction and other suitable information from vehicle sensors or vehicle systems that allows the in-vehicle call management system to determine driving situations such as merging, changing lanes and skidding.

FIG. 2 is a table illustrating an incoming call screening for an in-vehicle call management according to the invention in case of a driving situation involving some risk, wherein the risk is in this case smaller than the risks of an emergency situation. The in-vehicle call management system receives information related to various vehicle systems such as the windshield wipers, the fog lights, the navigation system, the transmission, the traction control system (ASR) and the electronic stability control system (ESP). The second column of FIG. 2 illustrates how the in-vehicle call management system evaluates the information in order to determine the cost of the call in terms of driver distraction. If the speed of windshield wipers is greater than a given value, the in-vehicle call management system concludes that there is a dangerous weather condition. If the fog lights are switched on, the in-vehicle call management system concludes that there are impaired vision conditions. If the navigation system indicates that the vehicle is traveling to a new destination, the in-vehicle call management system concludes that the driver is on an unfamiliar route. The navigation system may further indicate that the vehicle is in a location with adverse road conditions such as an accident hot spot or an area with heavy traffic. When the transmission of the vehicle is in reverse, the in-vehicle call management system concludes that the driver needs to concentrate on a parking maneuver or back-up maneuver. If the traction control system (ASR) or the electronic stability control system (ESP) indicate that the friction coefficient is less than a given value, the in-vehicle call management system concludes that the road is slippery.

In each of the above-described at-risk situations, the driver is in a situation that requires the driver to concentrate on the primary task of operating the vehicle. The in-vehicle call management system therefore communicates to the caller that the called person is driving and puts the caller on hold. The in-vehicle call management system alerts the driver to the call in a subtle manner such that the alert does not interfere with the task of operating the vehicle. The driver can choose to pick up the call or, alternatively, the driver can ignore the call.

FIG. 3 is a table illustrating an incoming call screening for an in-vehicle call management according to the invention in case of a situation when an incoming call is inconvenient for a driver. The information that is gathered for determining a situation when a telephone call may be inconvenient relates to activities such as a seat adjustment, a mirror adjustment, a climate control adjustment, operating the stereo system, entering information into the navigation system, receiving turn-by-turn directions from the navigation system, or using a handheld computer such as a personal digital assistant (PDA). In case of the above-listed situations, the in-vehicle call management concludes that the driver is preoccupied with adjusting or operating a device in the vehicle or that the driver needs to concentrate on an upcoming turn or exit and needs to listen to the instructions provided by the navigation system. In response to determining that an incoming call is inconvenient, the in-vehicle call management system tells the caller that the called person is driving and puts the caller on hold. The in-vehicle call management system provides a subtle alert in order to let the driver know about the incoming call. The driver can then pick up the call or can ignore the call.

FIG. 4 is a table illustrating an incoming call screening with user-set preferences for an in-vehicle call management according to the invention. In this case, the in-vehicle call management uses information such as a caller ID information, a pre-set call list or time information. Incoming calls can be screened based on the identity of the caller, based on the existence of certain driving conditions, or based on the time when the incoming call arrives. The user may for example set his or her preferences such that callers on a list are put through to the driver whereas callers that are not on the list are sent to the voice mail. In accordance with further preferences that may be set by the user, calls may be put through to the driver based on driving conditions or based on the time of the call.

FIG. 5 is a table illustrating a general incoming call screening for an in-vehicle call management according to the invention. Incoming calls are screened based on a caller ID and based on the caller urgency level of the call. In this case, the caller is prompted to enter a caller urgency level for the telephone call by entering a number on the caller's telephone key pad. The in-vehicle call management system recognizes the caller urgency level using DTMF (dual-tone multi-frequency) signaling. The in-vehicle call management system communicates to the caller that the user is driving. The caller can choose to stay on hold or the caller can hang up. The driver is alerted to the call and the in-vehicle call management system provides the caller ID information and the urgency level information to the driver. The driver can then decide to take the call or to ignore the call by pressing a "can't talk" button in which case the in-vehicle call management system tells the caller that the driver can't talk because the driver is driving.

In addition to the above-described screening of incoming calls, the in-vehicle call management system according to the invention also performs call management tasks during ongoing telephone calls as illustrated in FIGS. 6 and 7. Call management during a telephone call is in particular important because the driving situation may change such that the driver can no longer concentrate on the telephone conversation or such that the telephone call becomes a serious distraction for the driver. A main reason why cell phone use is distracting for drivers is because the caller is not in the same context as the driver. The caller is unaware of changes in the driving situation and thus the caller does not moderate his or her conversation in response to the changed driving situation. The in-vehicle call management system addresses changes in the driving situation by alerting the caller to the driver's need to concentrate and by muting the call in the vehicle if necessary. The alert that informs the caller about the driver's need to concentrate may for example be an audio tone for emergency situations or at-risk situations.

Furthermore, a semantic audio cue, which means audio that communicates the situation based on known associations, may be used to "amplify" in the call the comfort noises in the driver's environment. Comfort noises are generally understood as artificial background noises or artificially enhanced background noises. The semantic audio cues that are used as comfort noises are for example turn signal clicks, the noise of a windshield wiper operation or the noise of a honking horn. The caller can hear these semantic audio cues on the telephone line. The caller is thus made aware of the driver's situation. The in-vehicle call management system preferably uses associations between noises and driving situations that are familiar to the caller. For example, the noise of squealing tires can be used to indicate that the vehicle is braking. A truck's back-up beep can be used to indicate that the vehicle is backing up.

The in-vehicle call management system may further be configured to detect and amplify actual noise from the external driving environment. The amplified noise can then be used as a semantic cue in order to assist in orienting the caller to the driver's situation. An actual noise from the external driving environment is for example traffic noise or noise associated with an inclement weather condition.

In accordance with a preferred embodiment of the in-vehicle call management system, the system is configured to detect that the driver is not able to attend to a call in progress by monitoring the driver's phone call for conversational indicators of cognitive load. Conversational indicators of cognitive load are, for example, an articulation rate, filled and empty speech pauses, production of backchannel responses (e.g. "uh" and "um"), hesitations and speech disfluencies. A backchannel response is generally understood as an audible feedback (e.g. "uh" or "um") during a conversation. The frequency of producing these conversational indicators of cognitive load can be evaluated in order to determine that the driver is not able to concentrate on the phone conversation.

FIG. 6 is a table illustrating a call management during an ongoing telephone call for an in-vehicle call management system in case of an emergency situation. The in-vehicle call management system receives information from the vehicle brake system, the vehicle steering system, the traction control system (ASR) and, if applicable, the vehicle stability control system. The call management system further receives information about an actuation of the horn and the turn signal as well as vehicle speed and/or vehicle acceleration information. The in-vehicle call management system further detects conversational indicators of cognitive load. The sensed information is evaluated in order to determine the cost of the phone call in terms of how much the phone call is a distraction in a given driving situation. As illustrated in FIG. 6, if the amount of braking is greater than a given value, the in-vehicle call management system concludes that there is an emergency and that the cost of the call is accordingly high.

FIG. 6 lists further criteria that are used to determine whether an emergency situation exists. If the angle of turn is greater than a given value, the in-vehicle call management system concludes that there is a critical driving maneuver such as a sharp turn or swerving. The angle of turn is generally understood as the steering angle minus a slip angle, which is in many cases negligibly small so that the steering angle and the angle of turn are essentially the same. Other factors that allow the in-vehicle call management system to determine the existence of an emergency situation can be retrieved from the vehicle data network (CAN) such as a vehicle speed, a vehicle acceleration, turn signal and horn actuation or a coefficient of tire friction. In response to a determination that there is an emergency situation, the in-vehicle call management system mutes the phone call until the driving situation returns to normal. The caller hears a loud semantic audio cue, such as squealing tires or a honking horn, which lets the caller know that there is an emergency driving situation.

FIG. 7 is a table illustrating a call management during an ongoing telephone call for an in-vehicle call management according to the invention in case of a situation involving some risk. In order to determine whether a driving situation is to be classified as an "at-risk" situation, the in-vehicle call management system gathers information on whether the navigation system provides turn-by-turn instructions in which case the driver needs to hear and follow the instruction. In order to let the caller know that the driver needs to concentrate on the task of driving, the in-vehicle call management system adds the turn-by-turn navigation instructions as a background noise to the telephone call. If the vehicle is backing up, the caller hears a back-up beep as a background noise. Further, turn signal clicks, a windshield wiper noise, a rain noise or some other noise that is associated with a certain driving situation can be added as a background noise to the telephone call. If the in-vehicle call management system detects that the frequency of cognitive load indicators, such as backchannel responses, hesitations and speech disfluencies, indicates an increased cognitive load, a suitable background noise can be added as a background noise in order to communicate to the caller that the driver is not able to concentrate on the phone call. In this case, the background noise moderates the conversation and, as a result, the driver can concentrate on the task of driving.

In addition to the above-described screening of incoming calls and management of ongoing calls, the in-vehicle call management system according to the invention further performs an outgoing call management. Cell phones are often used by drivers in order to renegotiate a time and/or a place for meetings and in order to project future activities. As the vehicle is typically a means of transportation to meetings, meeting negotiation is an important use case for an in-vehicle telephone kit. Informing people of a current location of the vehicle provides valuable information about a driver's ability to be at a given destination at a given time. In some cases it is common that drivers communicate their current location and their planned destination repeatedly or regularly by using their cell phone. In this case, the in-vehicle call management system can be configured to automatically provide this information. As a result, the burden on the driver is reduced and the driver can concentrate on the task of driving. In this case, the in-vehicle call management system generates a message in the form of a voice mail, a user pre-recorded voice mail, or a text message in order to provide information about a current location of the vehicle and/or a destination of the vehicle. In order to increase the ease of use, templates for common messages may be used.

FIG. 8 is a table illustrating an assistance for outgoing messages for an in-vehicle call management according to the invention. If a driver is in a situation when he or she cannot talk, the driver inputs a telephone number. The in-vehicle call management system then sends an automated message to the telephone number ("caller") saying that the driver can't talk because the driver is driving. If the driver wants to communicate his or her location, the driver can enter a number and, if no route is in progress, the caller receives an automated message with the driver's current location. If the driver wants to communicate his or her destination to the caller while a route is in progress, the driver inputs a number and the caller receives an automated message with the driver's current location, the driver's destination and the estimated time of arrival. In case the driver wants to communicate that he or she is going to be late for a meeting, the driver inputs a number or, by using a PDA, accesses a meeting time and participants. A caller, i.e. the participants of the meeting, then receives an automated message with the driver's current location, destination and how late the driver will be for the meeting. Alternatively, the automated message may include the driver's current location and may ask to meet at the destination at the estimated time of arrival.

An exemplary method of screening incoming telephone calls in accordance with the invention in case of an emergency scenario is explained with reference to FIG. 9. The top portion of FIG. 9 illustrates the steps relating to the caller, the bottom portion of FIG. 9 illustrates the steps relating to the driver. In case of an incoming call indicated by block 10, the in-vehicle call management system assesses a current driving situation by using CAN messages as shown by block 12. The in-vehicle call management system takes into account the level of braking, the level of steering, a turn signal actuation, the speed, a horn actuation, the traction control and, if applicable, further CAN messages that are suitable for assessing the driving situation. The caller gets a message saying that the user is driving which is illustrated by block 14. If the caller stays on the line, the caller is placed on hold as shown by block 16. If the driver hangs up, while the caller is on the line or while and the caller is on hold, the caller receives a message saying that the driver cannot talk which is indicated by block 18. If the caller hangs up while or after listening to the message that the user is driving 14, the call is disconnected as shown by block 20.

If the in-vehicle call management system determines that there is an emergency situation, the driver is not alerted to the call as shown by block 22. The determination as to whether there is an emergency situation is performed in accordance with the above described criteria. For example, if the amount of braking is greater than a given value, the system concludes that there is an emergency situation. Also, if the angle of turn is greater than a given value, the system concludes that there is a sharp turn or that the vehicle is swerving and therefore the system concludes that there is an emergency situation. Further, if the driver uses the turn signal and the speed of the vehicle is greater than a given value, the in-vehicle call management system concludes that the driver is merging or changing lanes and the system assumes that there is an emergency situation. The in-vehicle call management system further assumes that there is an emergency situation if the coefficient of tire friction is less than a given value which means that the vehicle is skidding.

If the in-vehicle call management system determines that there is a safe situation, which is illustrated by block 24, the driver is alerted to the call and the in-vehicle call management system displays the caller ID as shown by block 26. If the caller hangs up, the in-vehicle call management system alerts the driver to the missed call and also displays the caller ID as illustrated by block 28. The in-vehicle call management system determines that there is a safe situation if the amount of braking and the angle of turn is less than a given value, if neither the turn signal nor the horn is being used and if the coefficient of tire friction is greater than a given value. If the caller is still on the line after the emergency situation ends, the driver can push a "can't talk" button and the call is disconnected as indicated by block 20 or, alternatively, the driver can accept the call as indicated by block 30.

Figure 10:
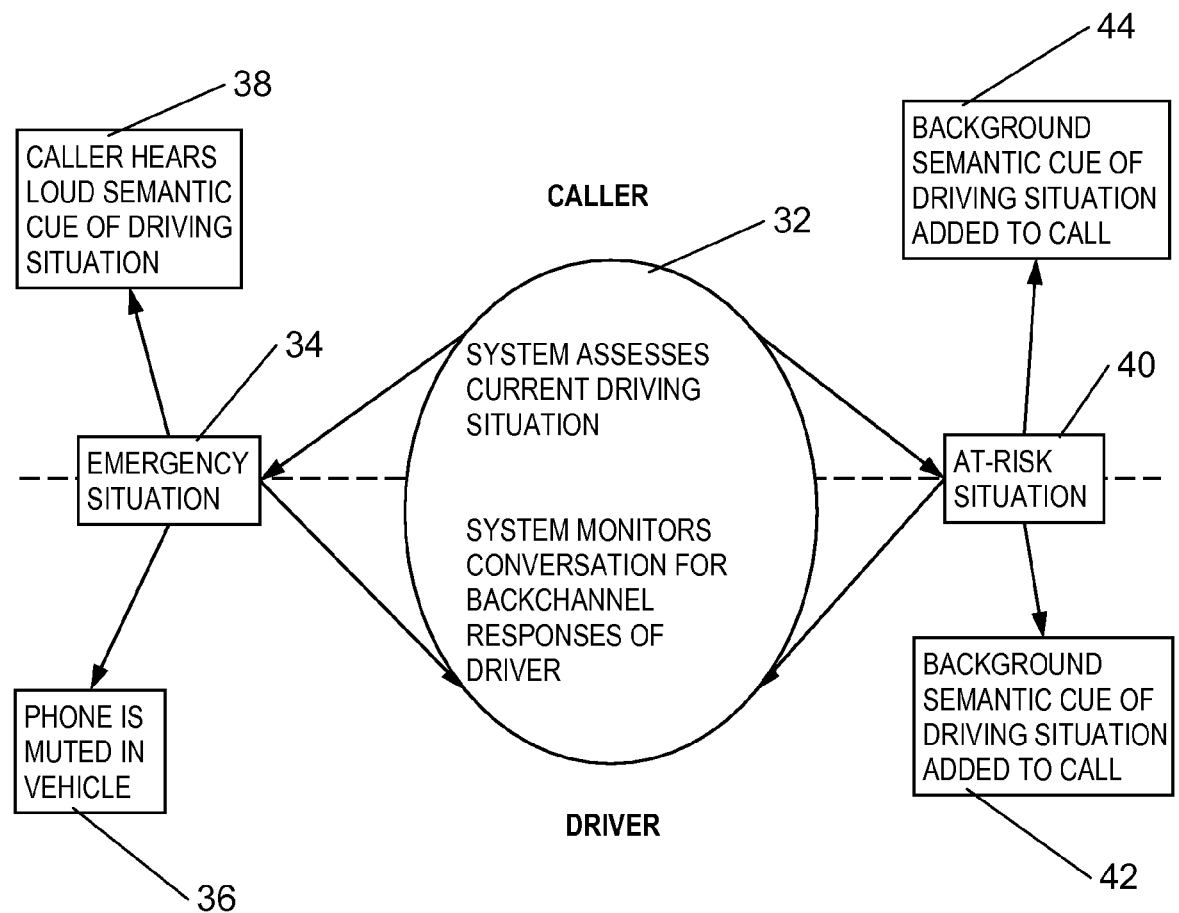
FIG. 10 is a flow chart illustrating a process of managing an ongoing telephone call in accordance with the invention.

FIG. 10 is a flow chart illustrating a process of managing an ongoing telephone call in accordance with the invention. The top portion of FIG. 10 illustrates the steps or actions relating to the caller, the bottom portion of FIG. 10 illustrates the steps or actions relating to the driver. The in-vehicle call management system assesses a current driving situation by using CAN messages and also monitors the conversation for backchannel responses of the driver which is shown by block 32. The in-vehicle call management system takes into account CAN messages related to braking, steering, speed, horn actuation, traction control, turn-by-turn navigation, turn signal use, windshield wipers, reverse gear selection and, if applicable, further CAN messages that are suitable for assessing the driving situation. In addition to backchannel responses, the in-vehicle call management system may of course evaluate further cognitive load indicators. If the in-vehicle call management system concludes that there is an emergency situation, as indicated by block 34, the in-vehicle call management system mutes the telephone in the vehicle as illustrated by block 36. The caller hears a semantic cue indicative of the driving situation as shown by block 38. As described above, the caller may hear screeching tires as a background noise in order to indicate hard braking, a sharp turn or skidding. If the driver honks, the caller may hear the sound of a honking horn as a background noise on the telephone line.

FIG. 10 further shows how the in-vehicle call management system handles an ongoing telephone call if there is an at-risk situation as indicated by block 40. In this case, the driver as well as the caller will hear a semantic cue that is indicative of the driving situation as indicated by blocks 42 and 44. The semantic cue that is added as a background noise modifies the conversation because the caller will be aware of the driving situation that the driver faces and will take the driving situation into account similar to how a passenger in the vehicle would take the driving situation into account when talking to the driver. The semantic cues may for example be turn-by-turn directions provided by the navigation system. The use of a turn signal may be indicated by turn signal clicks added as a background noise on the telephone line. A back-up beep may be used as a semantic cue when the vehicle transmission is in reverse. The use of the windshield wipers may be indicated by the sound of a windshield wiper operation or a rain noise.

Figure 11:
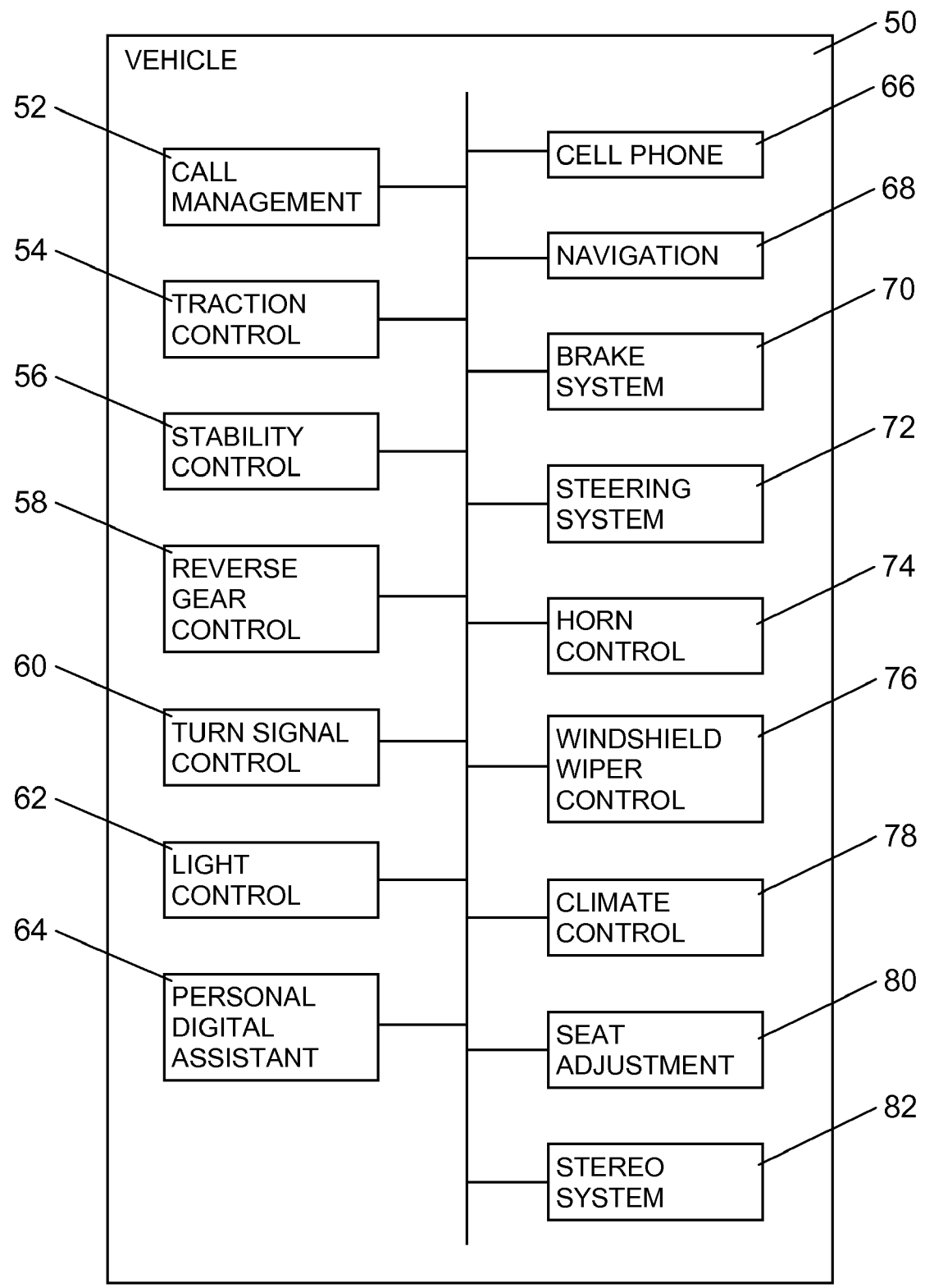
FIG. 11 is a schematic view of a vehicle including vehicle systems involved in a call management according to the invention.

FIG. 11 is schematic view of a vehicle 50 including vehicle systems involved in a method for managing calls of a cell phone 66. The vehicle 50 has a brake system 70, a steering system 72, a traction control system 54, and a stability control system 56. As described above, signals from these systems are provided via the vehicle's controller area network (CAN) and are evaluated by the in-vehicle call management system 52 in order to determine whether the current driving situation is an emergency situation or an at-risk situation. Further signals that are evaluated in order to assess a driving situation are provided by the navigation system 68, the horn control 74, the windshield wiper control 76, the reverse gear control 58, the turn signal control 60 and the light control 62, such as the fog light control. These signals are particularly suited to indicate that there is an at-risk-situation. For example, the windshield wiper control and the light control may indicate weather conditions that require the driver to focus on the task of driving. In addition, signals indicating that a vehicle occupant operates a climate control system 78, a seat adjustment system 80, a stereo system 82 or a personal digital assistant (PDA) 64 can be evaluated. An evaluation of these signals is suitable to determine whether an incoming telephone call arrives at an inconvenient time when the driver is likely to be preoccupied with a secondary task

What is claimed is:

1. A method for managing telephone calls, the method which comprises:
    monitoring signals provided by vehicle systems;
    monitoring conversational cognitive load indicators for a driver during a telephone call in a vehicle, wherein the conversational cognitive load indicators include at least one indicator selected from the group consisting of an articulation rate, a filled speech pause, an empty speech pause, a backchannel response, a hesitation, and a speech disfluency;
    assessing a current driving situation by evaluating the signals provided by the vehicle systems and by evaluating the conversational cognitive load indicators; and
    providing, in dependence of an assessment of the current driving situation, a semantic cue during the telephone call, wherein the semantic cue is indicative of the current driving situation and wherein the semantic cue is audible at least for a caller calling the driver.

2. The method according to claim 1, wherein the step of assessing a current driving situation by evaluating signals provided by vehicle systems includes evaluating at least one signal selected from the group consisting of a brake control signal, a steering angle signal, a vehicle speed signal, a horn control signal, a traction control signal, a stability control signal, a turn signal control signal, a fog light control signal, a windshield wiper control signal and a reverse gear engagement control signal.

3. The method according to claim 1, wherein the step of assessing a current driving situation further includes evaluating a navigation signal provided by an in-vehicle navigation system.

4. The method according to claim 1, wherein the step of providing a semantic cue indicative of the current driving situation includes providing, as the semantic cue, an artificial background noise selected from the group consisting of a sound of screeching tires, a sound of a horn, turn-by-turn navigation directions, turn signal click sounds, a back-up beep sound, a windshield wiper operating noise and a rain noise.

5. The method according to claim 1, wherein the step of assessing a current driving situation by evaluating signals provided by the vehicle systems includes concluding that the current driving situation is an emergency situation if an emergency condition is met, wherein the emergency condition is a condition selected from the group consisting of an amount of braking being greater than a given value, an angle of turn being greater than a given value and a coefficient of tire friction being less than a given value.

6. The method according to claim 5, which comprises:
    muting the telephone call in the vehicle in case of an emergency situation; and
    providing, as the semantic cue audible for the caller, an artificial background noise indicative of the emergency situation.

7. The method according to claim 1, wherein the step of assessing a current driving situation includes concluding that the current driving situation is an at-risk situation if an at-risk condition is met, wherein the at-risk condition is a condition selected from the group consisting of a turn signal activation, a reverse gear engagement, a windshield wiper operation and turn-by-turn navigation directions provided for the driver.

8. The method according to claim 7, which comprises providing the semantic cue such that the semantic cue is indicative for the at-risk situation and such that the semantic cue is audible for the driver and for the caller.

9. The method according to claim 1, wherein the step of assessing a current driving situation includes concluding that the current driving situation is an at-risk situation if an evaluation of the conversational cognitive load indicators shows that a threshold level for a cognitive load has been exceeded.

10. The method according to claim 1, wherein the step of monitoring conversational cognitive load indicators includes monitoring backchannel responses provided by the driver and wherein the step of assessing a current driving situation includes concluding that the current driving situation is an at-risk situation based on a frequency of the backchannel responses.

11. A method for managing telephone calls, the method which comprises:
    monitoring signals provided by vehicle systems;

receiving a telephone call in a vehicle;
assessing a current driving situation by evaluating the signals provided by the vehicle systems in order to determine whether the current driving situation is one of an emergency situation and an at-risk situation;
placing the telephone call on hold if the current driving situation is one of an emergency situation and an at-risk situation;
providing a message for a caller who has been placed on hold; and
selectively providing an alert to a driver about the telephone call if the current driving situation is an at-risk situation and providing no alert to the driver about the telephone call if the current driving situation is an emergency situation.

12. The method according to claim 11, which comprises providing an alert to the driver about the telephone call after the emergency situation ends.

13. The method according to claim 11, wherein the step of assessing a current driving situation by evaluating signals provided by the vehicle systems includes evaluating at least one signal selected from the group consisting of a brake control signal, a steering angle signal, a vehicle speed signal, a horn control signal, a traction control signal, an stability control signal, a turn signal control signal, a fog light control signal, a windshield wiper control signal, a navigation system control signal and a reverse gear engagement control signal.

14. The method according to claim 11, which comprises:
prompting a caller to communicate an urgency level of the telephone call; and
presenting the urgency level provided by the caller and an identification of the caller to the driver.

15. The method according to claim 11, which comprises:
determining whether the current driving situation is an inconvenient situation for accepting the telephone call based on evaluating at least one signal selected from the group consisting of a seat adjustment control signal, a mirror adjustment control signal, a climate adjustment control signal, a stereo adjustment control signal, a turn-by-turn navigation control signal and a personal digital assistant control signal; and
placing the caller on hold and providing an alert to the driver about the telephone call if the current driving situation is determined to be an inconvenient situation.

* * * * *